US012566690B2

(12) United States Patent
Lehmann et al.

(10) Patent No.: US 12,566,690 B2
(45) Date of Patent: Mar. 3, 2026

(54) AUTOMATIC TEST AUTOMATION CLASSIFICATION

(71) Applicant: SAP SE, Walldorf (DE)

(72) Inventors: Christian Lehmann, Rauenberg (DE); Sara Kuhn, Rauenberg (DE)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 18/490,983

(22) Filed: Oct. 20, 2023

(65) Prior Publication Data

US 2025/0130931 A1     Apr. 24, 2025

(51) Int. Cl.
G06F 11/3668     (2025.01)
G06F 11/362     (2025.01)

(52) U.S. Cl.
CPC ...... G06F 11/3692 (2013.01); G06F 11/3636 (2013.01); G06F 11/3676 (2013.01); G06F 11/3688 (2013.01)

(58) Field of Classification Search
CPC ............. G06F 11/3692; G06F 11/3636; G06F 11/3676; G06F 11/3688; G06F 11/3684
USPC ........................................................ 717/128
See application file for complete search history.

(56) References Cited

U.S. PATENT DOCUMENTS

| | | | |
|---|---|---|---|
| 9,754,014 B2 * | 9/2017 | Schmidtler ........... | G06F 16/285 |
| 2004/0064464 A1 * | 4/2004 | Forman ................... | G06F 16/35 |
| 2005/0108200 A1 * | 5/2005 | Meik ..................... | G06F 16/954 |
| 2014/0109053 A1 * | 4/2014 | Vasudevan .......... | G06F 11/3692 717/124 |
| 2020/0117583 A1 * | 4/2020 | Durairaj .............. | G06F 11/3692 |
| 2020/0242015 A1 * | 7/2020 | Catt ..................... | G06F 11/3684 |
| 2023/0418730 A1 * | 12/2023 | Kumar ................ | G06F 11/3684 |
| 2024/0020219 A1 * | 1/2024 | Jain ........................... | G06F 8/71 |
| 2024/0111555 A1 * | 4/2024 | Sundaresan ......... | G06F 11/3684 |

OTHER PUBLICATIONS

Kuchta, Tomasz, and Bartosz Zator. "Auto off-target: Enabling thorough and scalable testing for complex software systems." Proceedings of the 37th IEEE/ACM International Conference on Automated Software Engineering. 2022.pp. 1-12. (Year: 2022).*
Aniche, Maurício, Christoph Treude, and Andy Zaidman. "How developers engineer test cases: An observational study." IEEE Transactions on Software Engineering 48.12 (2021): pp. 4925-4946. (Year: 2021).*
De Winkel, Jasper, et al. "Dips: debug intermittently-powered systems like any embedded system." Proceedings of the 20th ACM Conference on Embedded Networked Sensor Systems. 2022. pp. 222-235. (Year: 2022).*

(Continued)

*Primary Examiner* — Satish Rampuria
(74) *Attorney, Agent, or Firm* — Buckley, Maschoff & Talwalkar LLC

(57) ABSTRACT

According to some embodiments, systems and methods are provided including executing a test, wherein the test evaluates a single object class; receiving a list of objects accessed by the test, wherein a test level classification is absent for each object included in the list; excluding one or more objects from the list of objects based on the object's inclusion in an exclusion object class; assigning the test level classification to the test based on the one or more non-excluded objects from the list; and storing the assigned test level classification with a test identifier. Numerous other aspects are provided.

20 Claims, 9 Drawing Sheets

(56)     References Cited

OTHER PUBLICATIONS

Borko, Harold, and Myrna Bernick. "Automatic document classification." Journal of the ACM (JACM) 10.2 (1963): pp. 151-162. (Year: 1963).*

Fod, Ajo, Maja J. Matarić, and Odest Chadwicke Jenkins. "Automated derivation of primitives for movement classification." Autonomous robots 12.1 (2002): pp. 39-54. (Year: 2002).*

Stallman, Richard M. "Emacs the extensible, customizable self-documenting display editor." Proceedings of the ACM SIGPLAN SIGOA symposium on Text manipulation. 1981.pp. 147-156. (Year: 1981).*

* cited by examiner

400

| 402<br>TEST CLASSIFICATION<br>LEVEL | 404<br>RULE |
|---|---|
| UNIT TEST | 1–2 OBJECTS<br>UNDER TEST |
| COMPONENT TEST | 2–10 OBJECTS UNDER<br>TEST FROM THE SAME<br>PACKAGE |
| INTEGRATION TEST | MULTIPLE COMPONENTS<br>OF DIFFERENT PACKAGES |
| SCENARIO TEST | DIFFERENT AREAS OF<br>CODE ARE COVERED |

AUTOMATIC TEST AUTOMATION CLASSIFICATION

BACKGROUND

Many enterprises are increasingly dependent on software applications, executed on-premise or in the cloud, that are developed to address their needs with respect to managing day-to-day activities of the enterprise. Often the software includes objects which are representations of a real-world entity (e.g., person, account, invoice, transaction, product) or a programming entity (e.g., variables and constants). Objects may enable designers to design an application in manageable pieces by breaking the enterprise down into a modular form and separating each function into an object so that as development of the application progresses, increasing complexity may be added without huge changes to other objects. The object may be a container for data (e.g., characteristics) and behavior that define the state of the object and the actions that the object will perform. Data may be exchanged between enterprise components via objects. An object is a blueprint or instance of a class. The class is a user-defined type that describes what a certain type of object will look like. The class is used to specify the form of an object and it combines data representation and methods for manipulating that data. The data and functions within a class are called members of the class and method members describe functions/internal procedures of the class that determine the behavior of the object. The class may be a group of one or more objects that may be described in terms of the attributes their members have in common. As a non-exhaustive example, for the class "Bicycle", a "MountainBicycle," a "SportsBicycle", a "TouringBicycle", etc. may be considered objects of the class. An object may be referred to as an "instance" of the class that allows programmers to use variables and methods from inside the class.

Often before the software is released to a user, the enterprise may want to execute a test of the software. Instead of having manual software testers, an enterprise may create automatic tests (automate) for testing the software code or objects. The tests may indicate whether the software works or not in a matter of seconds and minutes, as opposed to the days and weeks of manual testers. The automatic tests may be of different types, with some of the tests executing faster than other tests, and some of the tests being more robust against changes in the software than other tests. It may be desirable to have tests of different types that may be used in different testing scenarios. As a non-exhaustive example, a developer may want to execute a quick test to test a single changed line of code, or the developer may want to execute a longer test for the user interface. Conventionally, there is no automatic classification of the tests to indicate a test type, so a user may not know which tests they want to execute.

Systems and methods are desired which automatically classify the tests as a particular test type.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
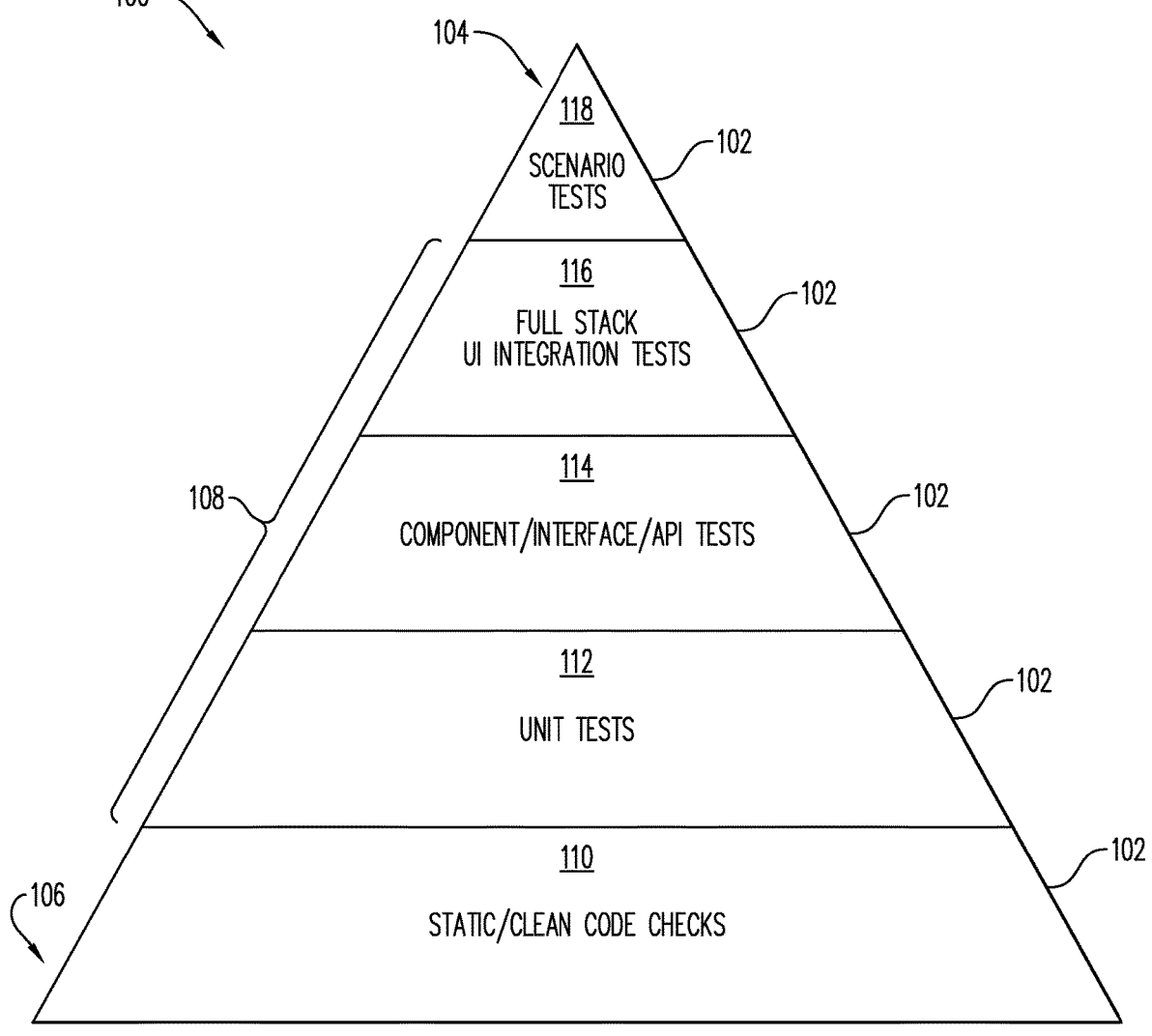
FIG. 1 is a test classification pyramid.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The disclosed embodiments relate to automatic test automation classification. In particular, embodiments relate to classifying a type of test based in part on the objects that are used by the application under test. The tests may be written in Advanced Business Application Programming (ABAP) language and the objects may be ABAP-based objects (e.g., ABAP classes). While other suitable programming languages may be used for the application code and objects under test, the following description will describe the application code and objects with respect to ABAP for case of discussion.

Conventionally, a unit testing framework may be used to ensure the correct behavior of the smallest testable unit (e.g., methods of classes) of code is verifiable. The unit testing framework may be used to verify quality, to refactor code, to perform regression testing, etc. The unit testing framework may run automated tests on the application code as the application code is being developed. The test itself may be referred to as a "test class" and may be code used to evaluate other pieces of code (application under test, for example) to ensure everything is functioning correctly and reliably. A non-exhaustive example of a unit testing framework may be ABAP Unit Framework®. The unit testing framework may provide for the creation and execution of a plurality of different types of automated tests. The test may be a unit test, a component test, an integration test or a scenario test. Other suitable tests may be used.

These types of tests may be part of a test pyramid 100 (FIG. 1). The test pyramid 100 is a model that breaks automated software tests into test levels 102 (e.g., categories) based on different granularities. At a top 104 of the pyramid the tests may be more integrated, require more resources, execute more slowly, and are therefore more costly than the tests at a bottom 106 of the pyramid which may be more isolated (less integrated), require less resources, execute more quickly, and may be less costly. It is also noted that the tests towards the top of the pyramid are more fragile tests to run because they have more dependencies, so all of the different parts need to operate correctly for the test to be successful. As a non-exhaustive example, if a particular data element is no longer available, or there is insufficient stock value, the test at the top may fail even though there is no error with the actual tested code/object itself. In contrast, the tests that are lower on the pyramid are more robust because they have less dependencies. As a non-exhaustive example, they may only check one object and are therefore quicker and less fragile. Further, it may be desirable to have less tests at the test level at the pyramid top 104 and more tests of the test level at the pyramid bottom 106, and a middle amount of tests of the test level(s) in a middle 108 of the pyramid. Here, the test levels 102 may be static/clean code checks 110, unit tests 112, component/interface/API tests 114, full stack UI integration tests 116 and scenario tests 118.

Static/clean code checks 110 may check coding issues including, but not limited to, programming errors, coding standard violations (e.g., forbidden statements), undefined values, syntax violations and security vulnerabilities. The static/clean code checks 110 may analyze the software without executing the code.

Unit tests 112 make sure that a certain unit of the code works as intended. Unit tests may have the narrowest scope of all the tests in the pyramid, besides the static/clean code checks 110. The unit test 112 may test an individual class (or in some instances, a single object/method), by behaving as a normal consumer (e.g., in a production environment) of the class and determining whether the processes happen according to the definition of the class. As a non-exhaustive example, an individual class may calculate the sum of two values, and the unit test 112 may verify that this class can only calculate this sum. As the unit test is only checking this single simple calculation, the unit test may be easy to write and execute.

Component/interface/API tests 114 may test individual components or modules of the software (e.g., a combination of different objects (e.g., some multiplication, some addition, some division) from a same class/package), without integrating them with other components. Herein, the terms "class" and "package" may be used interchangeably.

Full stack UI integration tests 116 may test multiple components of different packages and may be integrated with other parts (e.g., databases, file systems, network) that are outside of the application under test. Continuing with the non-exhaustive example above, while the unit test just tests the individual sum, the full stack UI integration test may include opening the user interface, clicking each button, etc. to test the calculation via the user interface. It is noted that while the full stack UI integration test 116 may also test the individual sum tested with the unit test, the full stack UI integration test would be more costly in terms of time and resources because first the UI needs to be opened, then a user clicks each button, etc., whereas the unit test is completely code-based.

Scenario tests 118 may include a sequence of process steps/tasks that are each performed automatically and test different areas of the code to complete an objective (e.g., code from the finance area, the delivery area, etc.). As a non-exhaustive example, for a scenario of manufacturing shoes, the tasks may include creating a purchase order for nature rubber, issuing a goods receipt once the rubber is received, etc. and each task may have a different UI. The scenario test 118 may test that each of these tasks are completed in the appropriate order.

Having a distribution of test types that fall within the shape of the test pyramid 100 may provide for effectively testing the software. However, in some instances users may not trust a unit test or a component test because they are so isolated (e.g., do not interact with other aspects of the application under test). These users may prefer to write and execute a scenario test since it shows what an end user may see on a user interface. Despite preferences of some users, it is important to test the code at a lower level from a functionality and resources perspective. For example, if a developer changes a line of code, the unit test may quickly (e.g., 2 milliseconds) test the functionality to determine if the code works as expected so they can continue developing the application. If the developer has to execute a scenario test (e.g., 5 minutes) for a simple code change, this may take too much time and be too costly. As such, developers need to know which tests are fast and which are slow, so they can trigger the fast tests manually without triggering a slower test. Users also need to know which tests fully test the entire application before they release the application to the public. It may further be desirable to be able to run only one or more specific types of tests. For example, running the unit and component tests because they are relatively quick which may be useful in an iterative development approach. Then, at the end of the day, (or other suitable period of time), it may be desirable to run all of the tests associated with the application.

Conventionally, the enterprise may have a plurality of tests but may not know which level the test belongs to, and how many of each test is in each level (e.g., is the test distribution shape that of a pyramid, an inverted pyramid, an hourglass, etc.). This lack of labeling may lead to an inappropriate distribution of resources and may lead to an application that is improperly tested. Embodiments address this by automatically classifying the test as a particular test level classification. Embodiments may trigger execution of the test and trace its usage (e.g., via a source trace) to see how many objects are in use by a test and which areas (e.g., classes, components, etc.) an object belongs to for identification of the level of the test. For example, if a test is executed and it is only calling one productive class—e.g., "sum" with respect to the above-described example—then in one or more embodiments, a test analyzer determines only one object is accessed. Then, per a rule set, the test analyzer may classify the test as a unit test. Similarly, if the test calls multiple objects—e.g., because it is collecting sum, multiplication, etc.—the test analyzer may classify the test as a component test based on the rules set.

Embodiments also provide for the execution of a particular test type in a given situation. As a non-exhaustive example, during a critical situation (e.g., when an emergency patch collection needs to be released), the right classification may be used to only trigger the more reliable tests but not the slow and sometimes flaky scenario tests. Embodiments may also provide for adjusting the test classification. For example, in a case that changes are made to a test such that different objects/classes, etc. are accessed during the test, the test classification may change a unit test to a component test. Embodiments may provide suggestions for an enterprise to change their test distribution to be more in-line with the pyramid shape.

Figure 2:
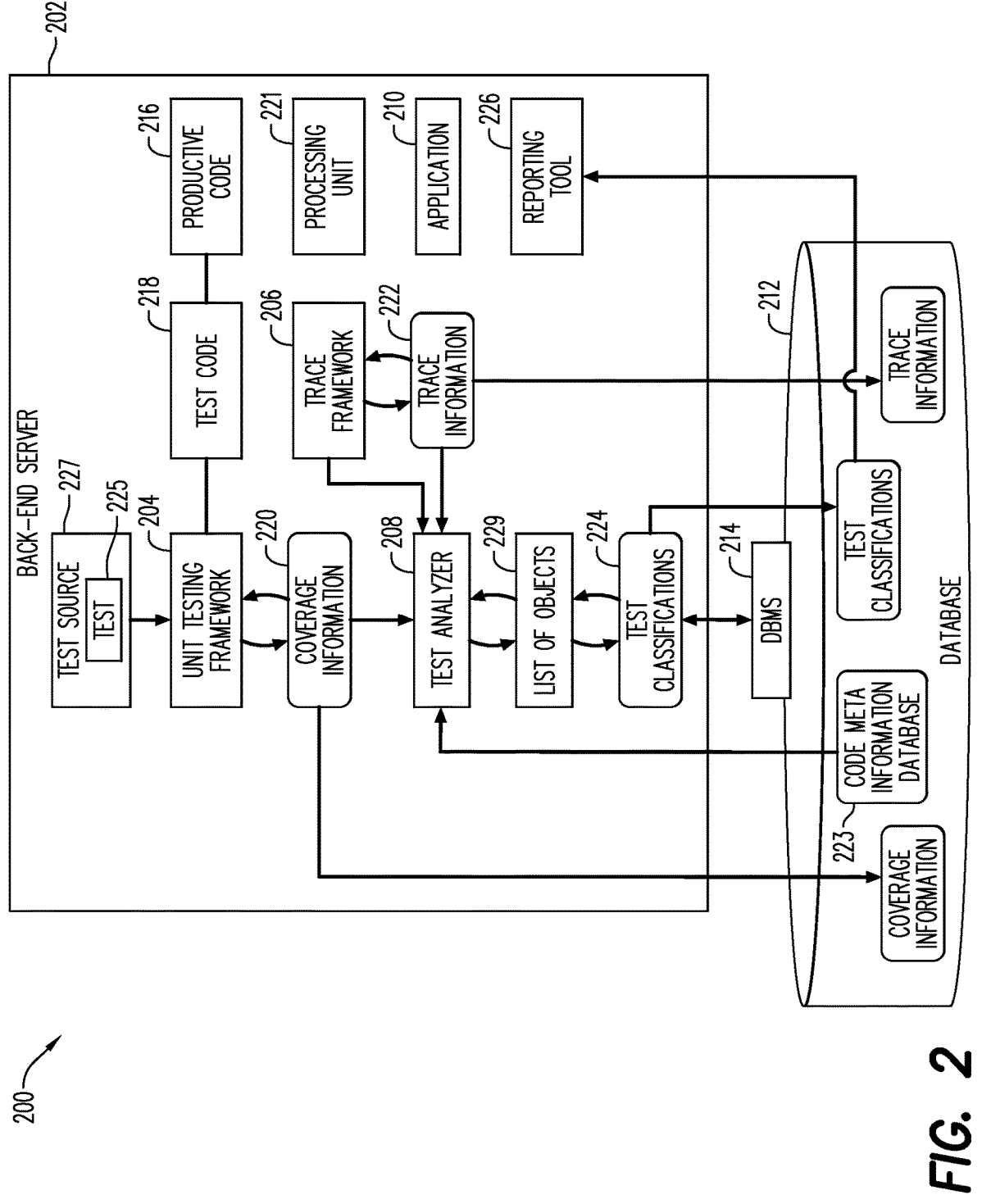
FIG. 2 is a block diagram of an architecture according to some embodiments.

FIG. 2 is a block diagram of system architecture ("system") 200 according to some embodiments. The illustrated elements of system architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of the system architecture 200 are implemented by a single computing device, and/or two or more elements of the system architecture 200 are co-located. One or more elements of the system architecture 200 may be implemented using cloud-based resources, and/or other systems which apportion computing resources elastically according to demand, need, price, and/or any other metric.

System architecture 200 includes a backend server 202 including a unit testing framework 204, a trace framework 206, a test analyzer 208, an application 210, a database 212 and a database management system (DBMS) 214.

The backend server 202 may provide any suitable interfaces through which users may communicate with the unit testing framework 204, trace framework 206, test analyzer 208 or applications 210 executing thereon. The backend server 202 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Generally, the backend server 202 executes one or more of applications 210 to provide functionality to a user. Applications 210 may comprise any software applications that are or become known, including but not limited to reporting and data analytics applications. Applications 210 may comprise web applications to provide desired functionality. The user may instruct the backend server 202 (via a remote system (not shown), for example), as is known, to execute one or more of applications 210 under test and an associated test for the application under test and the test is executed and then assigned a test level classification. The user may interact with resulting displayed user interfaces that are output from the execution of applications, to analyze the assignment.

The unit testing framework 204 may be used to verify quality, to refactor code, to perform regression testing, etc. The unit testing framework 204 may execute automated tests as the code is being developed and after it has been developed. A non-exhaustive example of a unit testing framework may be ABAP Unit Framework® by SAP. The unit testing framework 204 may allow development teams to write specific test classes which are only used for testing purposes in that they trigger other classes and then provide an assertion that the behavior of the triggered class was correct. The developer may divide the application under test into production code 216 and test code 218. The production code 216 may contain the logic of the program and is run in a production environment. The test code 218 is the part of the application that contains test classes which verify if the production code 216 works as expected. The test code 218 (test classes and their components) is not generated in production systems. As such, a test class cannot be accessed from the production code 216. Conversely, test classes can access all addressable components of the production code 216. Continuing with the above mathematical example, the program calls the sum method of the productive class and provides "2" and "4" as parameters with the assertion in the test that the result is "6". The unit testing framework 204 would execute the test, identify the target output as "6", and report that the test fails when an output of "5" is returned, for example. As such, the developer only has to write a test with a test class that calls a productive class and includes a specific command after the method call to indicate "6" s expected and if the output is not "6, output a failure indicator. It is noted that the classification level is not determined by the code calls in the test class, but by the sum of all of the calls that were actually called in. For example, the production code 216 may internally call a particular class repeatedly, resulting in a call stack with an indeterminate number of classes called by the production code.

In one or more embodiments, the unit testing framework 204 may output coverage information 220. The coverage information 220 may include the classes included in the production code to be accessed during execution of the test. The coverage information 220 may include an indicator of the number of classes to be accessed per the test during execution of the test, as well as the types of classes to be accessed. The coverage information 220 may be stored in the database 212. In some embodiments, the objects that have been accessed may be stored in a specific test classifications table.

The trace framework 206 may capture data that illustrates how the elements of the application under test are operating, executing and performing. The trace framework 206 may provide trace information 222 including each of the involved elements (e.g., database tables, etc.) accessed during execution of the test. The trace information 222 may also include an indicator of the number of classes actually accessed during execution of the test.

The test analyzer 208 may receive the coverage information 220, the trace information 222 and code meta information 223. The code meta information 223 may be a directory of repository objects and include the program ID that is part of requests and tasks, the object type and the object name in the object directory, the package the object is in, the creation date, when the code was last changed, etc. The code meta information 223 may also hold information indicating which package the productive code belongs to and the component the productive code belongs to. Non-exhaustive examples of the code meta information tables is shown in FIGS. 5-9, as described further below. It is noted that the date of the change may be used to identify whether the test level classification assignment may be outdated and re-iterated for the class. Based on the coverage information 220, the trace information 222, and the code meta information 223, the test analyzer may output a list of objects accessed during execution of the test. The test analyzer 208 may filter or exclude objects from the list of objects that are not from the test and the application under test. For example, the unit testing framework 204 may include test classes and associated objects, as well as other elements marked for testing and system objects in the coverage information from the unit test framework code that may not belong to the application under test. After the exclusion, the remaining (non-excluded) list of objects includes objects from the application under test. The test analyzer 208 may then assign a test level classification 224 to the test based on the non-excluded list of objects.

Pursuant to some embodiments, the test analyzer 208 may aggregate test levels assigned to a plurality of tests in a batch and transmit the aggregation and other assigned test level information to a reporting tool 226. The reporting tool 226 may output a report including the aggregation and other assigned test level information including, but not limited to, an assessment of the shape of the test distribution (e.g., a pyramid shape, hourglass, inverted pyramid, etc.) and a recommendation for changes to the distribution in a case it is not a pyramid.

Application 210 may be executed via one or more devices and may present user interfaces (e.g., graphical user interface (GUI)) to allow interaction with the application. Presentation of a user interface may comprise any degree or type of rendering, depending on the type of user interface code generated by the application 210. For example, a client (not shown) may execute a Web Browser request and receive a Web page (e.g., in HTML format) via HTTP, HTTPS and/or WebSocket, from an application 210 to provide the UI, and may render and present the Web page according to known protocols. The application client may also or alternatively present user interfaces by executing a standalone executable file (e.g., an .exe file) or code (e.g., a JAVA applet) within a virtual machine.

One or more applications 210 executing on backend server 202 may communicate with DBMS 214 using database management interfaces such as, but not limited to, Open Database Connectivity (ODBC) and Java Database Connectivity (JDBC) interfaces. These types of applications 210 may use Structured Query Language (SQL) to manage and query data stored in database 212.

DBMS 214 serves requests to store, retrieve and/or modify data of database 212, and also performs administrative and management functions. Such functions may include snapshot and backup management, indexing, optimization, garbage collection, and/or any other database functions that are or become known. DBMS 214 may also provide application logic, such as database procedures and/or calculations, according to some embodiments. This application logic may comprise scripts, functional libraries and/or compiled program code. DBMS 214 may comprise any query-responsive database system that is or becomes known, including but not limited to a structured-query language (i.e., SQL) relational database management system.

Backend server 202 may provide application services (e.g., via functional libraries) which applications 210 may use to manage and query the data of database 212. The application services can be used to expose the database data model, with its tables, hierarchies, views and database procedures, to clients. In addition to exposing the data model, backend server 202 may host system services such as a search service.

Database 212 may store data used by at least one of: applications 210 and the test analyzer 208. For example, database 212 may store the coverage information 220 and trace information 222 and code meta information 223 which may be accessed by the test analyzer 208 during execution thereof.

Database 212 may comprise any query-responsive data source or sources that are or become known, including but not limited to a structured-query language (SQL) relational database management system. Database 212 may comprise a relational database, a multi-dimensional database, an extensible Markup Language (XML) document, or any other data storage system storing structured and/or unstructured data. The data of database 212 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 202.

Figure 3:
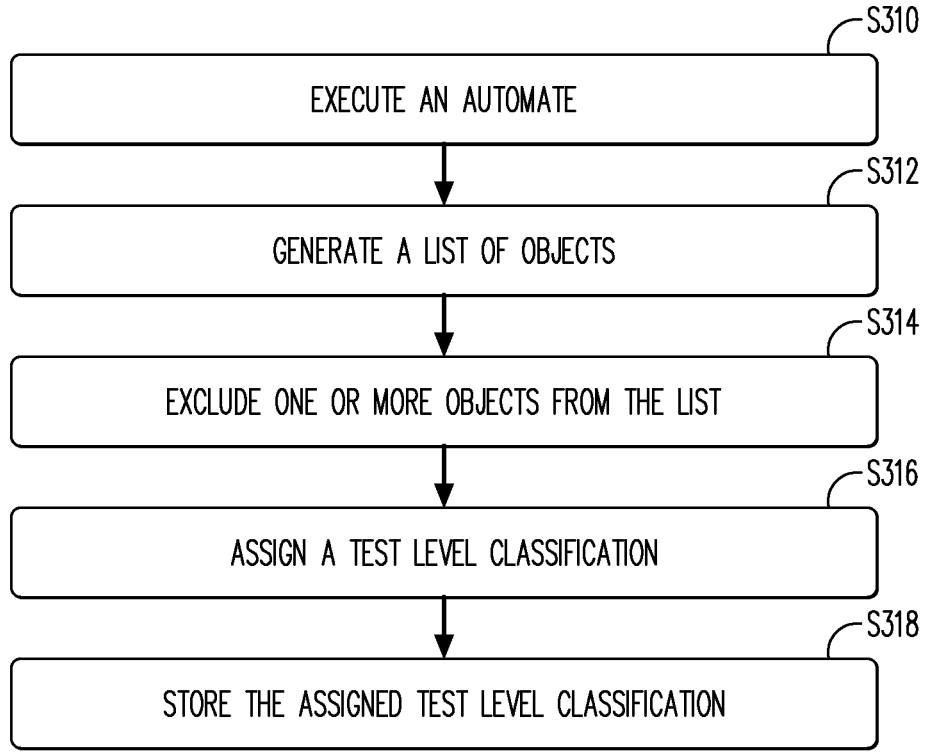
FIG. 3 is a flow diagram of a process according to some embodiments.

FIG. 3 illustrates a process 300 for assigning a test level classification to the test in accordance with an example embodiment.

For example, the process 300 may be performed by a database node, a cloud platform, a server, a computing system (user device), a combination of devices/nodes, or the like, according to some embodiments. In one or more embodiments, the backend server 202 may be conditioned to perform the process 300 such that a processing unit 221 (FIG. 2) of the system architecture 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the process 300, a test 225 may be selected from a test source 227 (e.g., a test repository). In some embodiments, the test may be selected by a developer for classification. In other embodiments, the system architecture 200 may identify new objects created in a production code since a last evaluation date, as provided by the code meta information 223, and select a test associated with those newly created objects. It is noted that a project/application may have thousands of developers working on it at the same time, with each developer working on their own classes and creating their own tests for the classes.

Initially at S310 the selected test 225 is executed. The test 225 may be executed via the unit testing framework 204. Execution of the test 225 includes execution of the test code 218 and the production code 216 for the test. The test may test a single test class at a time. The unit testing framework 204 may output coverage information 220 in response to execution of the test 225. The coverage information 220 may include the object classes to be accessed in the production code during execution of the test. As described above, while the test is being executed, the trace framework 206 may be executed at a same time (or approximately a same time) to track the functionality of the test. The trace framework 206 may output trace information 222 including each of the involved elements (e.g., database tables, etc.) accessed during execution of the test. The trace information 222 may also include an indicator of the number of classes actually accessed during execution of the test.

The test analyzer 208 may receive the coverage information 220, the trace information 222 and code meta information 223, and use this information to create a list of objects 229 in S312. A test level classification may be absent for each object in the list. Pursuant to some embodiments, in a case the classification is present, the object may remain on the list as classifications may change. As a non-exhaustive example, there may be adjustments to a unit test so that it may become a component test.

Then in S314, the test analyzer 208 may exclude one or more objects from the list of objects 229. The test analyzer 208 may filter or exclude objects from the list of objects that are not objects of the application under test. For example, the unit testing framework 204 may include test classes and associated objects, as well as other elements marked for testing (e.g., via a testing indicator 906 of FIG. 9) and system objects in the coverage information from the unit test framework code that may not belong to the application under test. Other suitable objects may be excluded from the list. Pursuant to some embodiments, the test analyzer 208 may include a list of object-types that may remain on the list. After the exclusion, the remaining (non-excluded) list of objects includes objects from the application under test.

Figure 4:
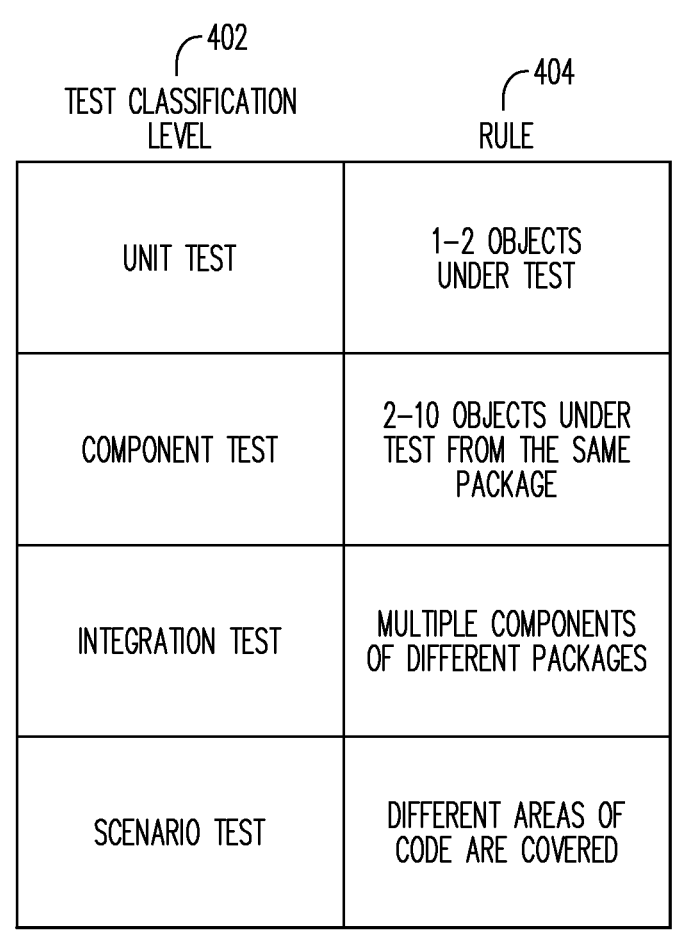
FIG. 4 is a chart according to some embodiments.
Figure 5:
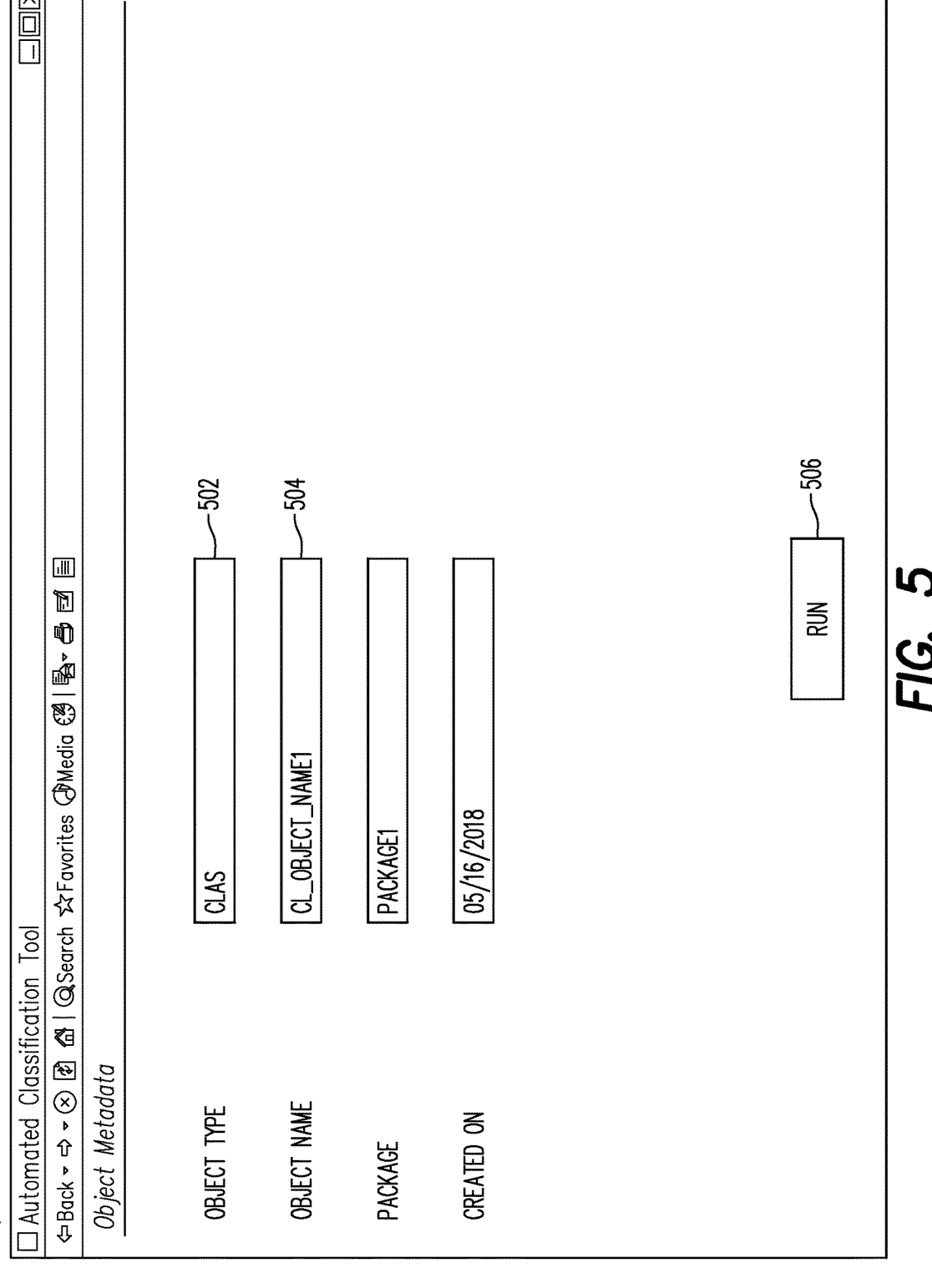
FIG. 5 is an outward view of a user interface according to some embodiments.

The test analyzer 208 may then assign a test level classification 224 for each remaining object in the list of objects 229. The test analyzer 208 may group the remaining objects in the list of objects based on the package and application component hierarchy from the code meta information 223. The test analyzer may then compare the groupings to a Rules Table 400 shown in FIG. 4. The Rules Table 400 includes a Test Level Classification 402 and an associated rule 404. In a case the objects under test belong to more than two different components, the test level classification 224 is a "Scenario Test". In a case the objects under test belong to two components or multiple packages, the test level classification 224 is an "Integration Test." In a case the objects under test belong to the same package but are more than two objects (e.g., 2-10 objects), the test level classification 224 is a "Component Test." In a case there are one to two objects under test, the test level classification 224 is a "Unit Test".

The assigned test level classification 224 for each object is stored in a database 212 in S318.

The process 300 may be iteratively repeated for a plurality of tests 225 in a batch of tests. After all of the tests in the batch have been assigned a test level classification that has been stored in the database 212, the test analyzer 208 may then retrieve the stored assigned test level classifications for each test and aggregate the retrieved assigned test level classifications based on the test level classification (e.g., 30 unit tests, 10 component tests, 5 integration tests and 3 scenario tests). The test analyzer 208 may provide an assessment of the shape of the test distribution (e.g., a pyramid shape, hourglass, inverted pyramid, etc.) based on the aggregated test levels. The assigned test levels, aggregation and assessment may be sent to the reporting tool 226 for display to a user.

Pursuant to embodiments, both a user and the test analyzer 208 are able to access the code meta information 223. The code meta information 223 may be a directory of repository objects. A user may access the object metadata via an Object Metadata user interface display 500 in accordance with some embodiments, as described with respect to FIG. 5. The directory of repository objects may include objects for specific classes as well as other classes. To view the objects for a specific class, the user may enter "CLAS" in the Object Type data entry field 502, and a specific object name in the Object Name data entry field 504 and select the "Run" control 506, resulting in a Display Package user interface display 600, shown in FIG. 6. It is noted that while other data entry fields (e.g., Package, and Created On) include data values, these values are not required to generate the Display Package user interface display 600. It is further noted that other suitable data entry fields may be included in the display 600, including, but not limited to, Source System, Author, Project Name, Master Language etc. Pursuant to some embodiments, simply entering the term "CLAS" in the Object Type data entry field 502 without information in the other fields and selecting the "Run" control 506 may result in another table (not shown) including one or more classes available for selection and including for each class a Package and Created On field. Based on the package, the component field 612 (FIG. 6) may be populated. As described above, the component data may be used in determining a test level classification.

Figure 6:
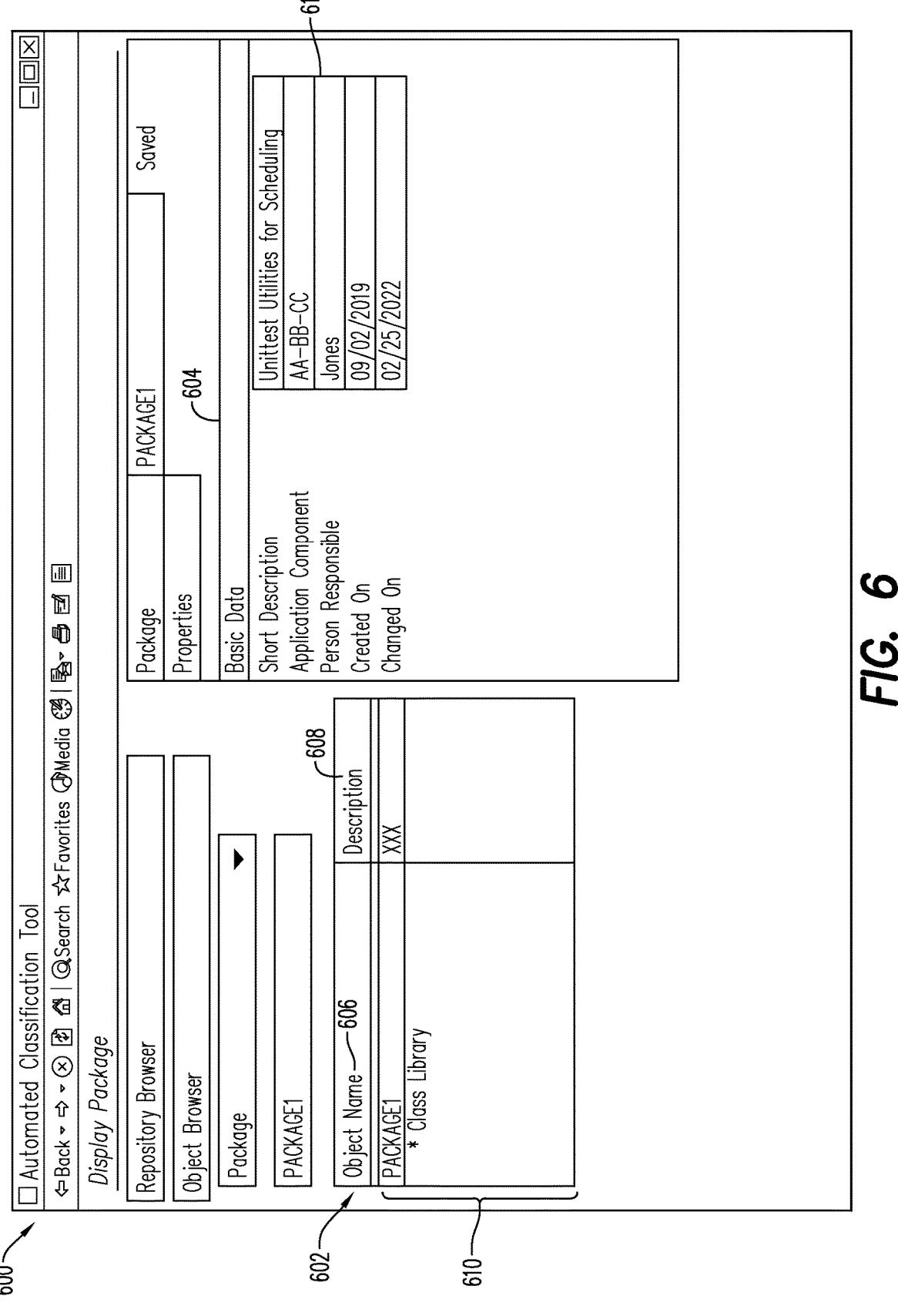
FIG. 6 is an outward view of a user interface according to some embodiments.
Figure 7:
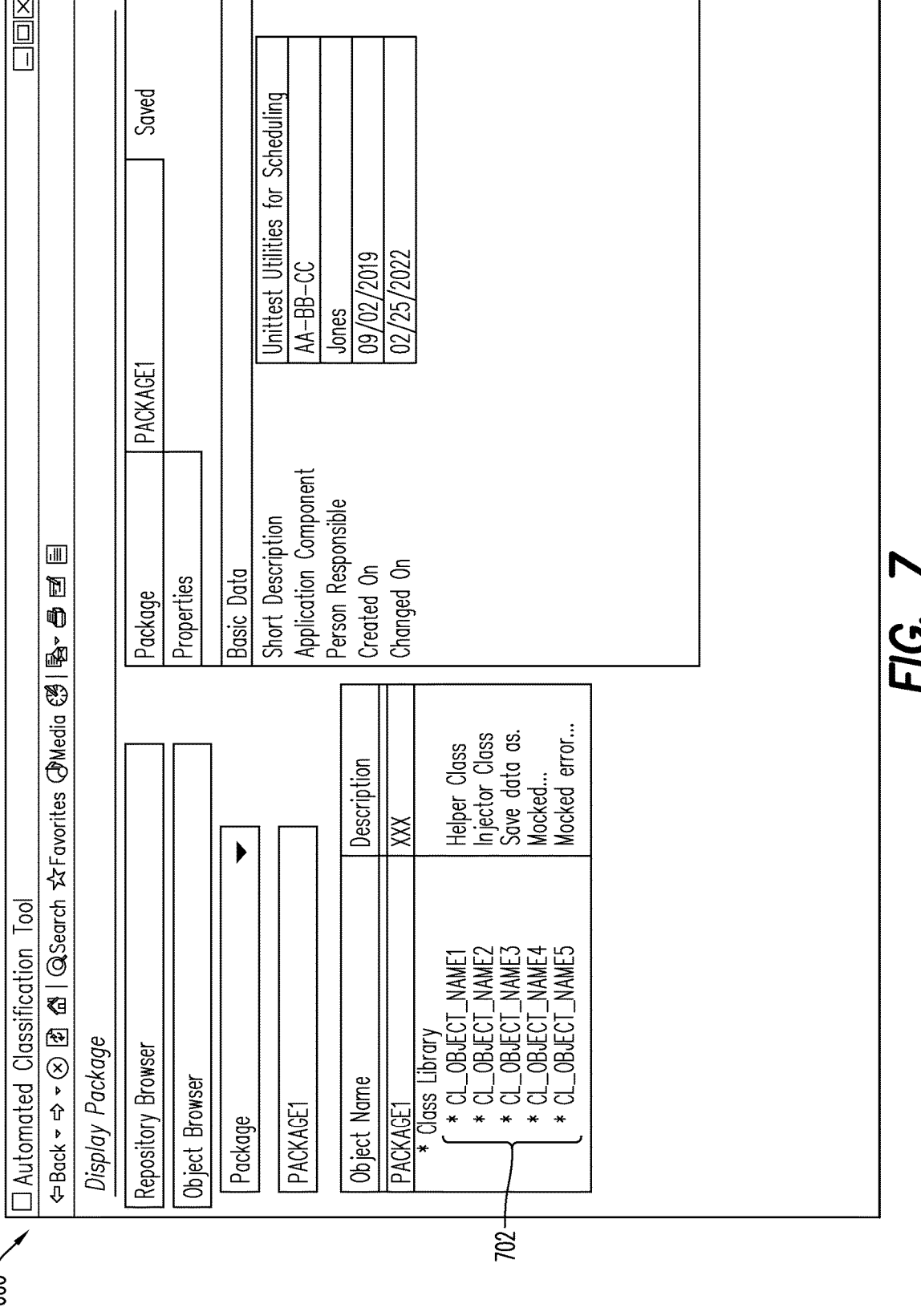
FIG. 7 is an outward view of a user interface according to some embodiments.

The Display Package user interface display 600 of FIG. 6 includes an object window 602, and a properties window 604. The object window 602 may include the object name 606 and a description 608. The object window 602 may also include other selectable parameters 610 that may provide more details about the object. A non-exhaustive example of the selectable parameters 610 includes a Class Library. Selection of the Class Library parameter 610, for example, may provide information on all of the classes for the object under test, as shown in the list of classes 702 shown in FIG. 7. While here, the list of classes 702 includes five test classes, the list of classes may also include classes from the application under test. As described above, the test class is a class that is used to test the functionality of another class (e.g., the package/class).

Figure 8:
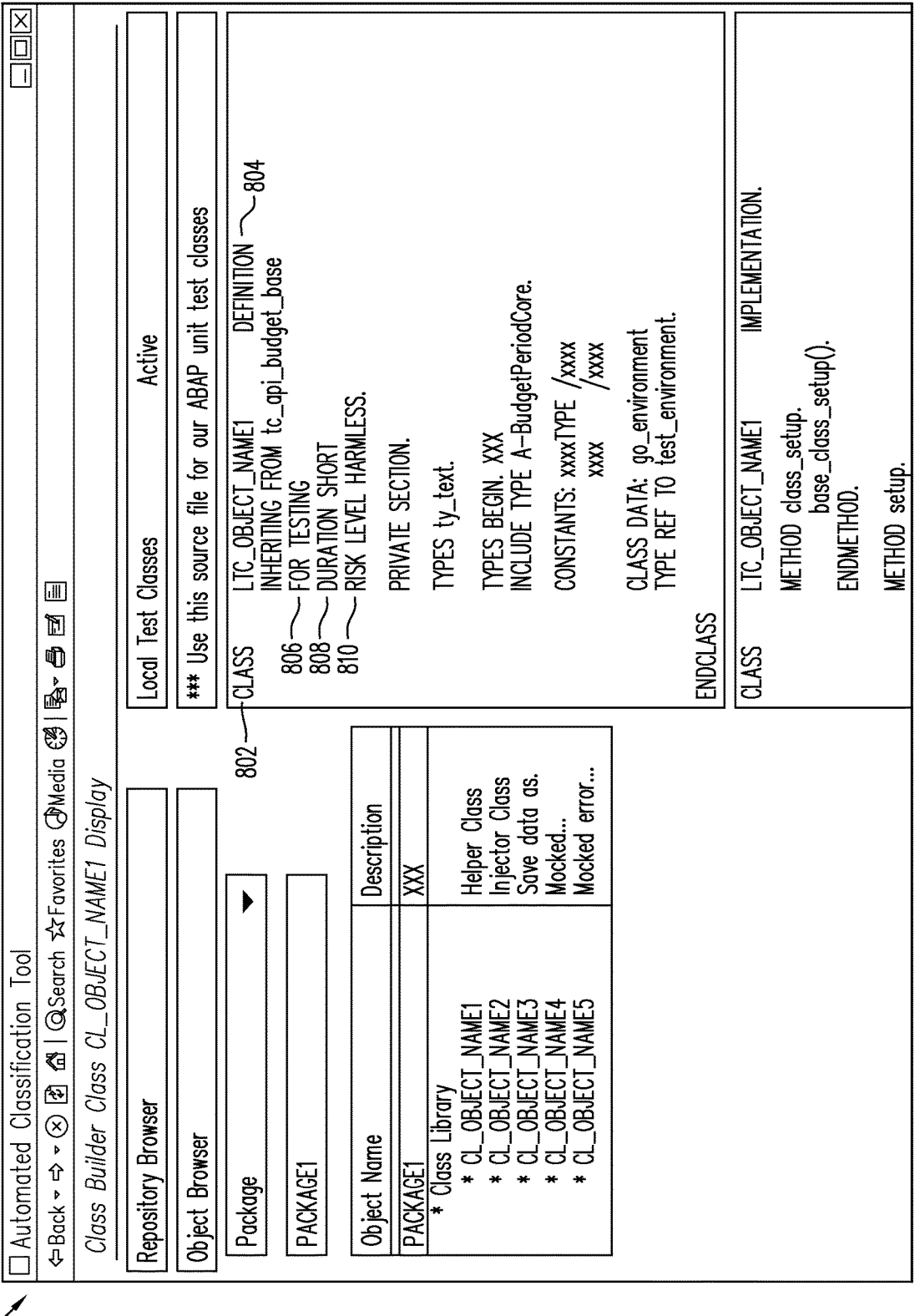
FIG. 8 is an outward view of a user interface according to some embodiments.

Selection of one of the classes in the list of classes 702 may result in the display of a definition for the selected class, as shown in the user interface display 800 of FIG. 8. The display 800 includes the class name 802, a definition 804, a testing indicator 806, a duration indicator 808 and a risk level indicator 810. Here, the testing indicator 806 indicates this is a test class and so it would be excluded from the list of objects at S314. The duration indicator 808 may be developer-defined for the class and may be short, medium or long. The risk level indicator 810 may also be developer-defined for the class and may be harmless, dangerous or other suitable indicator. It is noted that the duration indicator 808 and the risk level indicator 810 may be subjective as they are entered by the developer without adherence to a set of rules, unlike the test level classification determined by one or more embodiments.

Figure 9:
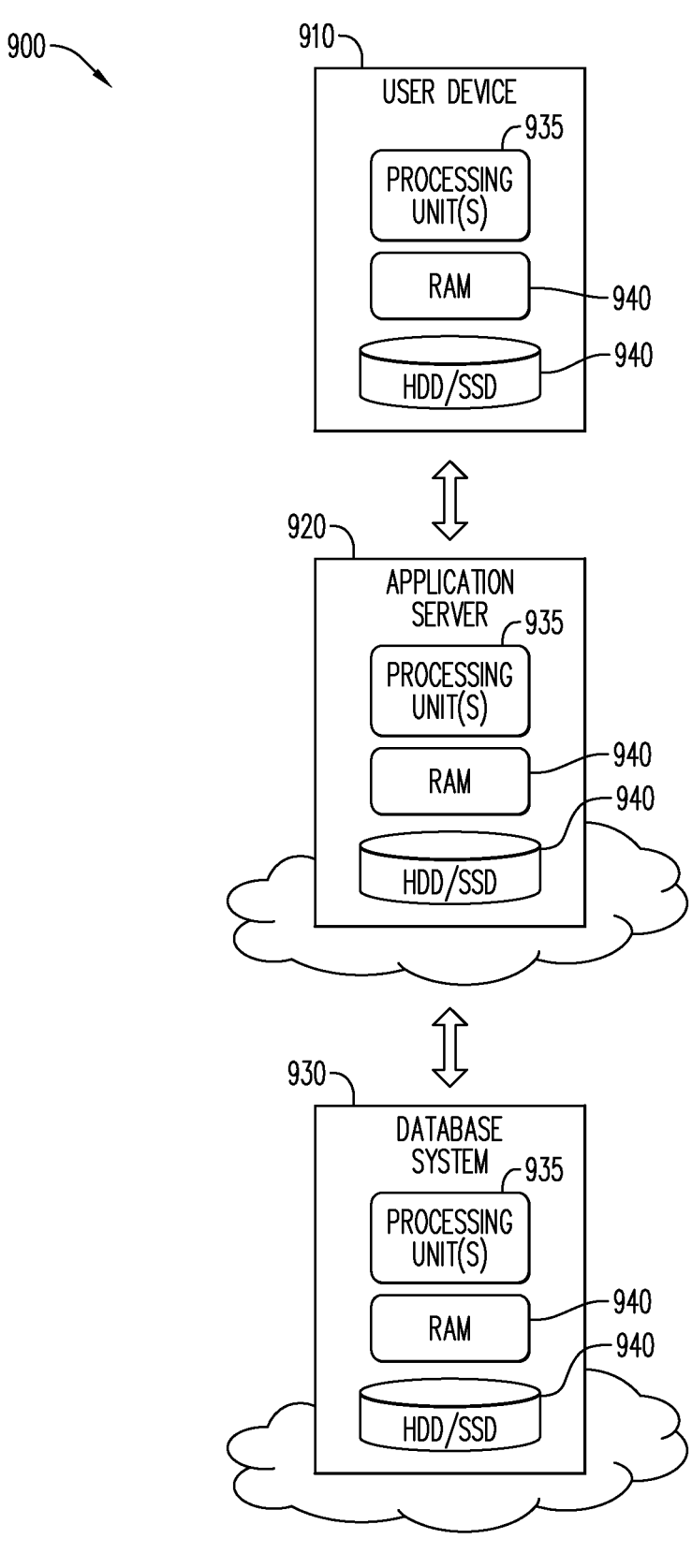
FIG. 9 is a block diagram of an apparatus according to some embodiments.

FIG. 9 illustrates a cloud-based database deployment 900 according to some embodiments. The illustrated components may reside in one or more public clouds providing self-service and immediate provisioning, autoscaling, security, compliance and identity management features.

User device 910 may interact with applications executing on the application server 920 (cloud or on-premise), for example via a Web Browser executing on user device 910, in order to create, read, update and delete data managed by database system 930. Database system 930 may store data as described herein and may execute processes as described herein to cause the execution of the test analyzer 208 for use with the user device 910. Application server 920 and database system 930 may comprise cloud-based compute resources, such as virtual machines, allocated by a public cloud provider. As such, application server 920 and database system 930 may be subjected to demand-based resource elasticity. Each of the user device 910, application server 920, and database system 930 may include a processing unit 935 that may include one or more processing devices each including one or more processing cores. In some examples, the processing unit 935 is a multicore processor or a plurality of multicore processors. Also, the processing unit 935 may be fixed or it may be reconfigurable. The processing unit 935 may control the components of any of the user device 910, application server 920, and database system 930. The storage devices 940 may not be limited to a particular storage device and may include any known memory device such as RAM, ROM, hard disk, and the like, and may or may not be included within a database system, a cloud environment, a web server or the like. The storage devices 940 may store software modules or other instructions/executable code which can be executed by the processing unit 935 to perform the method shown in FIG. 3. According to various embodiments, the storage device 940 may include a data store having a plurality of tables, records, partitions and sub-partitions. The storage device 940 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a test source;
a memory storing processor-executable program code; and
a processing unit to execute the processor-executable program code to cause the system to:
execute a test selected from the test source, execution of the test includes execution of a trace tracking one or more objects accessed in execution of the test;
receive a list of objects accessed by the test;
exclude one or more objects from the list of objects based on an object's inclusion in an exclusion object class, resulting in one or more remaining objects in a remaining list of objects;
assign a test level classification to the test based on productive code and application component hierarchy for the one or more remaining objects in the remaining list of objects, wherein the test level classification indicates a test type, and the assignment uses an object area for the tracked object; and
store the assigned test level classification with a test identifier.

2. The system of claim 1, wherein the test level classification is one of a unit test, a component test, an integration test and a scenario test.

3. The system of claim 1, further comprising processor-executable program code to cause the system to:
group the one or more remaining objects from the list based on a package associated with the one or more remaining objects and an application component associated with the remaining objects; and
assign the test level classification to the test based on at least one of a number of non-excluded objects from the list, the package associated with the one or more non-excluded objects and the application component associated with the non-excluded objects.

4. The system of claim 1, wherein the exclusion object class is at least one of a testing object class and a system object class.

5. The system of claim 1, wherein execution of the test includes execution of test code and productive code.

6. The system of claim 5, wherein execution of the test code and the productive code generates coverage information.

7. The system of claim 1, wherein the test evaluates a single object class.

8. The system of claim 1, further comprising processor-executable program code to cause the system to:
iteratively execute successive tests in a batch, wherein each test evaluates a single object class.

9. The system of claim 8, further comprising processor-executable program code to cause the system to:

retrieve the stored assigned test level for each test;

aggregate the retrieved assigned test levels based on test level; and output a report including the aggregations.

10. The system of claim 1, wherein trace information is generated by the execution of the trace.

11. The system of claim 10, wherein the trace information includes one or more tables accessed during execution of the test.

12. A computer-implemented method comprising:

executing a test, wherein the test evaluates a single object class, and execution of the test includes execution of a trace tracking one or more objects accessed in execution of the test;

receiving a list of objects accessed by the test;

excluding one or more objects from the list of objects based on an object's inclusion in an exclusion object class, resulting in one or more remaining objects in a remaining list of objects;

assigning a test level classification to the test based on productive code and application component hierarchy for the one or more remaining objects in the remaining list of objects, wherein the test level classification indicates a test type, and the assignment uses an object area for the tracked object; and storing the assigned test level classification with a test identifier.

13. The method of claim 12, wherein the test level classification is one of a unit test, a component test, an integration test and a scenario test.

14. The method of claim 12, further comprising:

grouping the one or more remaining objects from the list based on a package associated with the one or more remaining objects and an application component associated with the remaining objects; and assigning the test level classification to the test based on at least one of a number of remaining objects from the list, the package associated with the one or more remaining objects and the application component associated with the remaining objects.

15. The method of claim 12, further comprising:

iteratively executing successive tests in a batch, wherein each test evaluates a single object class.

16. The method of claim 15, further comprising:

retrieving the stored assigned test level for each test;

aggregating the retrieved assigned test levels based on test level; and outputting a report including the aggregations.

17. The method of claim 12, wherein the exclusion object class is at least one of a testing object class and a system object class.

18. A non-transitory computer readable medium having executable instructions stored therein to perform a method, the method comprising:

executing a test, execution of the test including execution of a trace tracking one or more objects accessed in execution of the test;

receiving a list of objects accessed by the test;

excluding one or more objects from the list of objects based on an object's inclusion in an exclusion object class, resulting in one or more remaining objects in a remaining list of objects;

assigning a test level classification to the test based on productive code and application component hierarchy for the one or more remaining objects in the remaining list of objects objects from the list, wherein the test level classification indicates a test type, and the assignment uses an object area for the tracked object; and storing the assigned test level classification with a test identifier.

19. The medium of claim 18, wherein the test level classification is one of a unit test, a component test, an integration test and a scenario test.

20. The medium of claim 18, further comprising:

grouping the one or more remaining objects from the list based on a package associated with the one or more remaining objects and an application component associated with the remaining objects; and assigning the test level classification to the test based on at least one of a number of remaining objects from the list, the package associated with the one or more remaining objects and the application component associated with the remaining objects.

* * * * *